United States Patent
Kodama et al.

(10) Patent No.: US 9,222,421 B2
(45) Date of Patent: Dec. 29, 2015

(54) VEHICLE DRIVE CONTROL IN RESPONSE TO BRAKE DETECTION ERRORS

(75) Inventors: Shinya Kodama, Toyota (JP); Masashi Takagi, Nagoya (JP); Michihito Shimada, Toyota (JP); Akihiro Kida, Toyota (JP); Motonari Obayashi, Susono (JP); Hiroshi Shimada, Mishima (JP); Akito Oonishi, Nagoya (JP); Takamasa Kitamura, Nagoya (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 2 days.

(21) Appl. No.: 14/112,472

(22) PCT Filed: Apr. 21, 2011

(86) PCT No.: PCT/JP2011/059834
§ 371 (c)(1),
(2), (4) Date: Oct. 17, 2013

(87) PCT Pub. No.: WO2012/144049
PCT Pub. Date: Oct. 26, 2012

(65) Prior Publication Data
US 2014/0039774 A1  Feb. 6, 2014

(51) Int. Cl.
*B60W 50/02* (2012.01)
*B60W 50/10* (2012.01)
*F02D 29/02* (2006.01)
*F02N 11/08* (2006.01)
*B60T 17/22* (2006.01)
*F02N 11/10* (2006.01)

(52) U.S. Cl.
CPC ............ *F02D 29/02* (2013.01); *B60W 50/10* (2013.01); *F02N 11/0822* (2013.01); *B60T 17/22* (2013.01); *B60T 2270/413* (2013.01); *B60W 50/0205* (2013.01); *B60W 50/0225* (2013.01); *B60W 2050/0215* (2013.01); *F02N 11/10* (2013.01); *F02N 2200/101* (2013.01); *F02N 2200/102* (2013.01); *Y02T 10/48* (2013.01)

(58) Field of Classification Search
CPC ................... B60W 50/0205; B60W 50/0225; B60W 50/10; B60W 2050/0215
USPC ........................................... 701/99
See application file for complete search history.

(56) References Cited

U.S. PATENT DOCUMENTS 5,542,756 A * 8/1996 Luckevich et al. ...... 303/122.11
7,328,092 B2 * 2/2008 Eggert et al. ............ 701/31.7
(Continued)

FOREIGN PATENT DOCUMENTS

| JP | 2004-044475 A | 2/2004 |
| JP | 2006-240617 A | 9/2006 |
| JP | 2008-063953 A | 3/2008 |

OTHER PUBLICATIONS

International Search Report of PCT/JP2011/059834 dated Jun. 7, 2011.

*Primary Examiner* — John R Olszewski
*Assistant Examiner* — Todd Melton
(74) *Attorney, Agent, or Firm* — Sughrue Mion, PLLC

(57) ABSTRACT

An electronic control unit (1) stops output suppression control for an engine (6) at the time of simultaneous depression of an accelerator pedal (2) and a brake pedal (4) when the depression of the brake pedal (4) is erroneously detected due to an ON-failure of a stop lamp switch (5) even if the brake pedal is not depressed.

3 Claims, 2 Drawing Sheets

(56) References Cited

U.S. PATENT DOCUMENTS

| | | | |
|---|---|---|---|
| 8,260,516 B2 * | 9/2012 | Bechtler et al. | 701/70 |
| 8,392,052 B2 * | 3/2013 | Takeda | 701/29.1 |
| 8,494,743 B1 * | 7/2013 | Albertson | 701/70 |
| 8,620,548 B2 * | 12/2013 | Shibasaki et al. | 701/70 |
| 2004/0007208 A1 | 1/2004 | Suzuki et al. | |
| 2009/0254237 A1 * | 10/2009 | Takahashi et al. | 701/29 |

* cited by examiner

Normal Time

Time of ON-Failure

VEHICLE DRIVE CONTROL IN RESPONSE TO BRAKE DETECTION ERRORS

CROSS REFERENCE TO RELATED APPLICATIONS

This is a National Stage of International Application No. PCT/JP2011/059834 filed Apr. 21, 2011, the content of all of which is incorporated herein by reference in its entirety.

FIELD OF THE DISCLOSURE

The present invention relates to a control device applied to a vehicle that obtains drive force from output of a drive source.

BACKGROUND OF THE DISCLOSURE

A control device for a vehicle is known in the prior art that outputs, in response to simultaneous performance of an acceleration input and a brake input by depression of both of the accelerator pedal and the brake pedal, a throttle-OFF signal to reduce the output of the engine, which is a drive source of the vehicle, thereby ensuring the vehicle stability and protection of the engine and the power train, as disclosed in Patent Document 1, for example.

PRIOR ART DOCUMENTS

Patent Documents

Patent Document 1: Japanese Laid-Open Patent Publication No. 2008-063953

SUMMARY OF THE INVENTION

Problems that the Invention is to Solve

Typically, the detection of a brake input, or the detection of a brake operation, is executed by using the stop lamp switch for turning on the stop lamps. In such a configuration, if the stop lamp switch is continuously on due to a failure such as the switch being stuck, it is determined that an acceleration input and a brake input are simultaneously performed at each input of an acceleration signal. Thus, even if the driver depresses the accelerator pedal with the intention to accelerate, the engine output will be suppressed, resulting in the drive force of the vehicle not being increased in accordance with the driver's intention.

Also, in cases in which a sensor or a switch other than the stop lamp switch is used to detect a brake input, a failure of such a sensor or a switch may cause an erroneous detection of a continuous brake input. This will cause the same problem as described above.

Accordingly, it is an objective of the present invention to reliably prevent determination of simultaneous performance of an acceleration input and a brake input from being indiscriminately made each time there is an input of an acceleration signal due to a failure and to reliably suppress degradation of the drivability due to such determination.

Means for Solving the Problems

To achieve the foregoing objective, the present invention provides a control device for a vehicle, in which the control device is applied to a vehicle that obtains drive force from output of a drive source and executes output suppression control for the drive source when an acceleration input and a brake input are performed simultaneously. When a current state is discovered to cause an erroneous detection of a brake input even though there is no brake input by a driver, a control mode of the output suppression control in such a state is different from a control mode of the output suppression control when there is no such discovery.

Even if the driver is not performing any operation that would cause a brake input, an erroneous detection of a brake input can occur due to a failure such as a switch being stuck. In such a case, if output suppression control for the drive source is designed to be executed in response to detection of both an acceleration input and a brake input, an acceleration input and a brake input are indiscriminately determined to have been performed each time there is an acceleration input, so that the output of the drive source is suppressed. Therefore, the driver's operation for an acceleration input will not increase the drive force of the vehicle. This degrades the drivability.

In this respect, according to the present invention, when erroneous detection as shown above is discovered, the output suppression control for the drive source is executed in a manner different from that in a case where there is no such discovery. Therefore, when an acceleration input and a brake input are erroneously determined to have been simultaneously performed due to a failure, a process, which is different from that for a normal simultaneous performance, is executed to prevent degradation of driving performance.

For example, when erroneous detection as described above is discovered, the output suppression control may be inhibited. Alternatively, compared to a case in which there is no such discovery, the extent of reduction of the drive source output may be decreased in the output suppression control. These measures suppress the degradation of the drivability.

The present invention also provides a control device for a vehicle, in which the control device is applied to a vehicle that obtains drive force from output of a drive source and determines that there is simultaneous performance of an acceleration input and a brake input in response to detection of both of the acceleration input and the brake input. When a current state is discovered to cause a brake input to be erroneously detected when there is no brake input, the control device determines that there is no simultaneous performance of an acceleration input and a brake input even if an acceleration input and a brake input are both detected.

With this invention, when a failure causes an erroneous detection of a brake input even if no operation for a brake input has been performed, simultaneous performance of an acceleration input and a brake input is assumed to have not occurred even if an acceleration input and a brake input are both detected. This reduces the chances of indiscriminate determination of simultaneous performance of an acceleration input and a brake input due to a failure each time there is an acceleration input. In a case in which the output suppression control for the drive source is designed to be executed in response to determination of simultaneous performance of an acceleration input and a brake input, the output of the drive source is prevented from being indiscriminately suppressed each time there is an acceleration input.

The occurrence of a failure in which a brake input is assumed to be continued regardless whether an operation for a brake input is being executed can be discovered when a signal for detecting a brake input has continued to be input for a period longer than some extent.

The present invention also provides a control device for a vehicle, in which the control device is applied to a vehicle that obtains drive force from output of a drive source and executes output suppression control for the drive source when an accelerator input and a brake input are performed simultaneously. When it is detected that a signal for detecting the brake input has continued to be input for a preset time, a control mode of the output suppression control is different from a control mode of the output suppression control when there is no such detection. According to this invention, when an acceleration input and a brake input are erroneously determined to have been simultaneously performed due to a failure, a process different from that for a normal simultaneous performance is executed to prevent the drivability from being degraded.

The present invention provides a control device for a vehicle, in which the control device is applied to a vehicle that obtains drive force from output of a drive source and executes output suppression control for the drive source when an accelerator input and a brake input are performed simultaneously. When it is detected that a signal for detecting the brake input has continued to be input for a preset time, the output suppression control is not executed. Thus, the output suppression control is prevented from being indiscriminately performed each time there is an accelerator operation. This prevents the drivability from being degraded.

The present invention further provides a control device for a vehicle, in which the control device is applied to a vehicle that obtains drive force from output of a drive source and executes output suppression control for the drive source when an accelerator input and a brake input are performed simultaneously. When it is detected that a signal for detecting the brake input has continued to be input for a preset time, an amount of decrease of the output of the drive source in the output suppression control is reduced compared to a case in which there is no such detection. Thus, when a failure as described above occurs, a greater output is obtained from the drive source than in a case of a normal simultaneous performance of an acceleration input and a brake input. Thus, the invention is capable of preventing the drivability from being degraded.

A failure can occur in which a brake input state continues whether or not a brake input operation is actually being performed. Since the brake input state continues when such a failure occurs, the number of brake input signal detections is reduced. Therefore, the occurrence of such a failure can be detected based on the fact that the number of brake input signal detections during a certain vehicle traveling period is less than or equal to a predetermined number.

The present invention provides a control device for a vehicle, in which the control device is applied to a vehicle that obtains drive force from output of a drive source and executes output suppression control for the drive source when an accelerator input and a brake input are performed simultaneously. When it is discovered that a number of times a brake input detection signal is output is less than or equal to a preset number during a certain vehicle traveling period, a control mode of the output suppression control is different from a control mode of the output suppression control when there is no such discovery. According to this invention, when an acceleration input and a brake input are erroneously determined to have been simultaneously performed due to a failure, a process different from that for a normal simultaneous performance is executed to prevent the drivability from being degraded.

The present invention also provides a control device for a vehicle, in which the control device is applied to a vehicle that obtains drive force from output of a drive source and executes output suppression control for the drive source when an accelerator input and a brake input are performed simultaneously. When it is discovered that a number of times a brake input detection signal is output is less than or equal to a preset number during a certain vehicle traveling period, the output suppression control is not executed. Thus, the output suppression control is prevented from being performed each time there is an accelerator operation. This prevents the drivability from being degraded.

Further, the present invention provides a control device for a vehicle, in which the control device is applied to a vehicle that obtains drive force from output of a drive source and executes output suppression control for the drive source when an accelerator input and a brake input are performed simultaneously. When it is discovered that a number of times a brake input detection signal is output is less than or equal to a preset number during a certain vehicle traveling period, an amount of decrease of the output of the drive source in the output suppression control is reduced compared to a case in which there is no such discovery. Thus, when a failure as described above occurs, a greater output is obtained from the drive source than in a case of a normal simultaneous performance of an acceleration input and a brake input. Thus, the invention is capable of preventing the drivability from being degraded.

A failure can occur in which a state of a brake input of being performed continues even though an operation for a brake input is not actually being performed. When such a failure occurs, the suppression control is executed on the output of the drive source each time an acceleration input is performed, and the output of the drive source is not increased in a manner in accordance with the intention of the driver. This can cause the driver to feel uncomfortable due to lack of the intended increase in the output of the drive source, which may make the driver to repetitively perform operations of acceleration input. Therefore, the occurrence of such a failure can be detected based on the fact that the number of acceleration inputs during a preset vehicle traveling period is great.

The present invention provides a control device for a vehicle, in which the control device is applied to a vehicle that obtains drive force from output of a drive source and executes output suppression control for the drive source when an accelerator input and a brake input are performed simultaneously. When it is discovered that a number of accelerator inputs during a preset vehicle traveling period is greater than or equal to a preset number, a control mode of the output suppression control is different from a control mode of the output suppression control when there is no such discovery. According to this invention, when an acceleration input and a brake input are erroneously determined to have been simultaneously performed due to a failure, a process different from that for a normal simultaneous performance is executed to prevent the drivability from being degraded.

The present invention provides a control device for a vehicle, in which the control device is applied to a vehicle that obtains drive force from output of a drive source and executes output suppression control for the drive source when an accelerator input and a brake input are performed simultaneously. When it is discovered that a number of accelerator inputs during a preset vehicle traveling period is greater than or equal to a preset number, the output suppression control is not executed. Thus, the output suppression control is prevented from being performed each time there is an accelerator operation. This prevents the drivability from being degraded.

The present invention further provides a control device for a vehicle, in which the control device is applied to a vehicle that obtains drive force from output of a drive source and executes output suppression control for the drive source when an accelerator input and a brake input are performed simultaneously. When it is discovered that a number of accelerator inputs during a preset vehicle traveling period is greater than or equal to a preset number, an amount of decrease of the output of the drive source in the output suppression control is reduced compared to a case in which there is no such discovery. Thus, when a failure as described above occurs, a greater output is obtained from the drive source than in a case of a normal simultaneous performance of an acceleration input and a brake input. Thus, the invention is capable of preventing the drivability from being degraded.

DETAILED DESCRIPTION OF THE PREFERRED EMBODIMENTS

Figure 1:
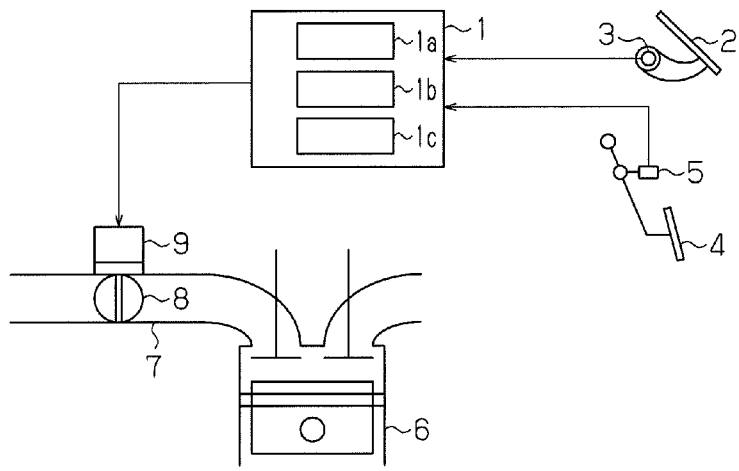
FIG. 1 is a schematic diagram showing the overall configuration of one embodiment of the present invention.

A control device for a vehicle according to one embodiment of the present invention will now be described with reference to FIGS. 1 to 3. The control device of the present embodiment is applied to a vehicle that obtains a drive force from the output of an engine, which serves as a drive source.

The configuration of the present embodiment will first be described with reference to FIG. 1. As shown in FIG. 1, the control device for a vehicle according to the present embodiment is mainly constituted by an electronic control unit 1 mounted on a vehicle. The electronic control unit 1 includes a central processing unit (CPU) 1a, which executes runs various computational processes for controlling the vehicle, a read-only memory (ROM) 1b, which stores control programs and data, a random access memory (RAM) 1c, which temporarily stores computational results from the CPU 1a and detection results from sensors.

The electronic control unit 1 is connected to sensors and switches located at various positions in the vehicle, which include an accelerator pedal sensor 3 for detecting the amount of depression of an accelerator pedal 2 and a stop lamp switch 5 for turning on stop lamps in response to depression of a brake pedal 4. The electronic control unit 1 is also connected to actuators located at various positions in the vehicle, which include a throttle motor 9 for actuating a throttle valve 8. The throttle valve 8 is located in an intake passage 7 of an engine 6, which is a drive source of the vehicle, and is used to regulate the output of the engine 6.

In the vehicle as described above, the electronic control unit 1 acquires the driving condition of the vehicle based on detection results from the sensors and switches. In accordance with the acquired driving condition of the vehicle, the electronic control unit 1 outputs command signals to the actuators to control the vehicle.

As part of the vehicle control, the electronic control unit 1 executes output suppression control for the engine 6 when the accelerator pedal 2 and the brake pedal 4 are simultaneously depressed, that is, when an acceleration input and a brake input are simultaneously performed. In the output suppression control, the electronic control unit 1 detects depression of the accelerator pedal 2 (acceleration input) from a detection signal of the accelerator pedal sensor 3 and detects depression of the brake pedal (a brake input) when the stop lamp switch 5 is turned on.

When determining that the accelerator pedal 2 and the brake pedal 4 are simultaneously depressed, the electronic control unit 1 overwrites, with a value less than the actual value, the detection value of the depression amount of the accelerator pedal 2 detected by the accelerator pedal sensor 3. In accordance with the overwritten value, the electronic control unit 1 controls the throttle motor 9 to reduce the opening degree of the throttle valve 8, thereby lowering the output of the engine 6.

If the stop lamp switch 5 is stuck at the ON state, the electronic control unit 1 recognizes that the brake pedal 4 is in a depressed state whether or not the brake pedal 4 is actually depressed. In such a case, a conventional control device for a vehicle determines that there is a simultaneous performance of an acceleration input and a brake input and executes the output suppression control each time the accelerator pedal 2 is depressed. Therefore, even if the driver depresses the accelerator pedal 2, the drive force of vehicle is not increased.

In the present embodiment, the electronic control unit 1 checks whether the brake pedal 4 is in a state where depression of the brake pedal 4 is erroneously detected without actual depression, that is, whether the stop lamp switch 5 has an ON-failure. When discovering that the stop lamp switch 5 has an ON-failure, the control unit 1 determines that there is no simultaneous performance of an acceleration input and a brake input even if it detects depression of both of the accelerator pedal 2 and the brake pedal 4. In this case, the control unit 1 cancels the output suppression control for the engine 6.

In the present embodiment, an ON-failure of the stop lamp switch 5 is detected from duration of an ON state of the stop lamp switch 5. Specifically, the electronic control unit 1 determines that there is an ON-failure when the duration of the ON state of the stop lamp switch 5 exceeds a preset determination value α.

Figure 2A:
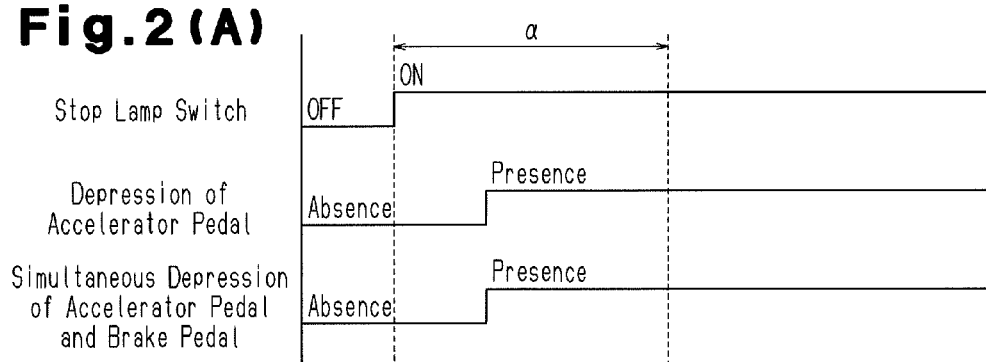
FIG. 2(A) is a time chart showing a mode for determining simultaneous depression of an accelerator pedal and a brake pedal when the duration of the ON state of a stop lamp switch is short.
Figure 2B:
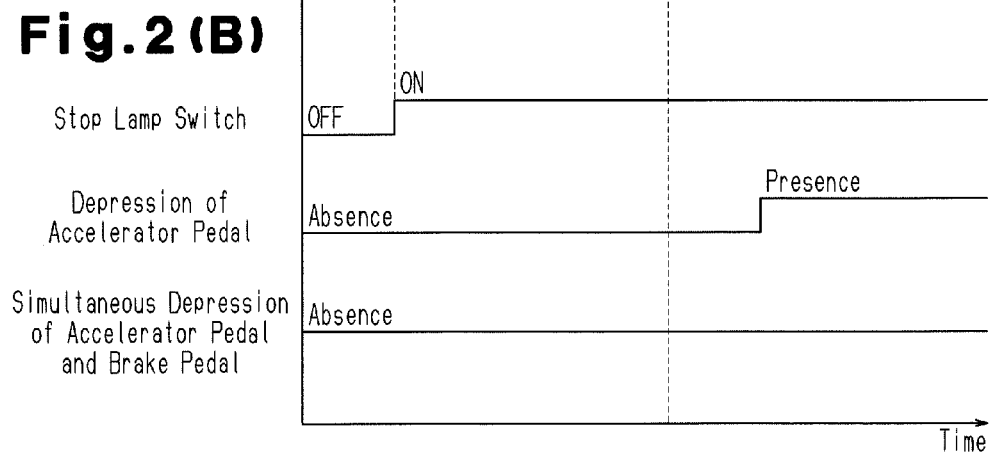
FIG. 2(B) is a time chart showing a mode for determining simultaneous depression of the accelerator pedal and the brake pedal when the duration of the ON state of the stop lamp switch is long.

That is, in the present embodiment, if the accelerator pedal 2 is depressed when the duration of the state in which the stop lamp switch 5 is ON is less than or equal to the determination value α as shown in FIG. 2(A), it is determined that there is a simultaneous performance of an acceleration input and a brake input. In contrast, in a case where the accelerator pedal 2 is depressed after the duration of the state in which the stop lamp switch 5 is ON surpasses the predetermined value α as shown in FIG. 2(B), it is determined that there is no simultaneous depression of the accelerator pedal 2 and the brake pedal 4 (simultaneous performance of an acceleration input and a brake input) even if depression of the accelerator pedal 2 and depression of the brake pedal 4 are both detected.

Figure 3:
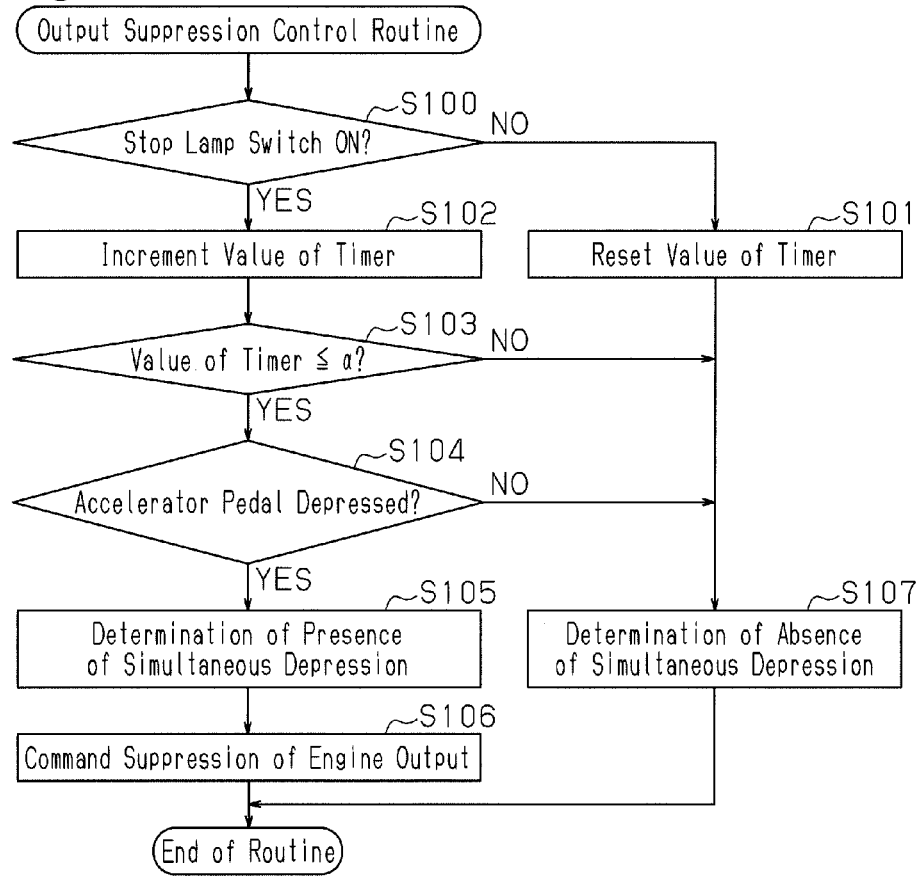
FIG. 3 is a flowchart showing a procedure for a routine of output suppression control for an engine at simultaneous depression of the accelerator pedal and the brake pedal.

With reference to FIG. 3, the procedure of the control routine for the engine output suppression control in response to a simultaneous performance of an acceleration input and a brake input will be described. The process of this routine is repeatedly executed by the electronic control unit 1 at predetermined intervals while the vehicle is traveling.

When the routine is started, it is first determined whether the stop lamp switch 5 is ON at step S100. If the stop lamp switch 5 is OFF (S100: NO), the value of the timer is reset at step S101. The timer indicates the duration of the state in which the switch 5 is ON. Then, at step S107, it is determined that the accelerator pedal 2 and the brake pedal 4 are not simultaneously depressed (no simultaneous performance of an acceleration input and a brake input), and the current cycle of the routine is ended.

Also, if the stop lamp switch 5 is ON (S100:YES), the value of the timer is incremented at step S102. In the subsequent step S103, it is determined whether the value of the timer is less than or equal to the preset determination value α.

If the value of the timer is less than or equal to preset determination value α, it is determined whether the accelerator pedal 2 is being depressed at the subsequent step S104. If the accelerator pedal 2 is being depressed (S104: YES), it is determined at step S105 that there is simultaneous depression of the accelerator pedal 2 and the brake pedal 4 (there is simultaneous performance of an acceleration input and a brake input), and suppression of the engine output is commanded in the subsequent step S106. In contrast, if the accelerator pedal 2 is not being depressed (S104: NO), it is determined at step S107 that the accelerator pedal 2 and the brake pedal 4 are not simultaneously depressed (absence of simultaneous performance of an acceleration input and a brake input), and the current cycle of the routine is ended.

On the other hand, if the value of the timer is determined to be greater than the preset determination value α at step S103 (NO), it is determined at step S107 that the accelerator pedal 2 and the brake pedal 4 are not simultaneously depressed, and the current cycle of the routine is ended. That is, in this case, even if depression of the accelerator pedal 2 and depression of the brake pedal 4 are both detected, it is determined that there is actually no such simultaneous depression, or that there is no simultaneous performance of an acceleration input and a brake input, so that the output suppression control for the engine 6 is not executed.

The present embodiment as described above has the following advantages.

(1) In the present embodiment, when the stop lamp switch 5 is discovered to have an ON-failure, it is determined that there is no simultaneous depression of the accelerator pedal 2 and the brake pedal 4 (no simultaneous performance of an acceleration input and a brake input) even if depression of both of the accelerator pedal 2 and the brake pedal 4 is detected. At this time, even if depression of both of the accelerator pedal 2 and the brake pedal 4 is detected, the output suppression control for the engine 6 is not executed. In the present embodiment, when an ON-failure of the stop lamp switch 5 is discovered, the mode of control in the output suppression control for the engine 6 at simultaneous depression of the accelerator pedal 2 and the brake pedal 4 is changed to cancel the output reduction of the engine 6. Therefore, the present embodiment prevents determination of simultaneous performance of an acceleration input and a brake input from being indiscriminately made every time there is an acceleration input, thereby reliably preventing the drivability from being degraded.

(2) In the present embodiment, an ON-failure of the stop lamp switch 5, that is, a state in which there is an erroneous detection of depression of the brake pedal 4 even if the brake pedal 4 is not depressed, is detected from the duration of an ON state of the stop lamp switch 5. Therefore, an ON-failure of the stop lamp switch 5 can be detected without providing any dedicated sensor.

The above described embodiment may be modified as follows.

Figure 4A:
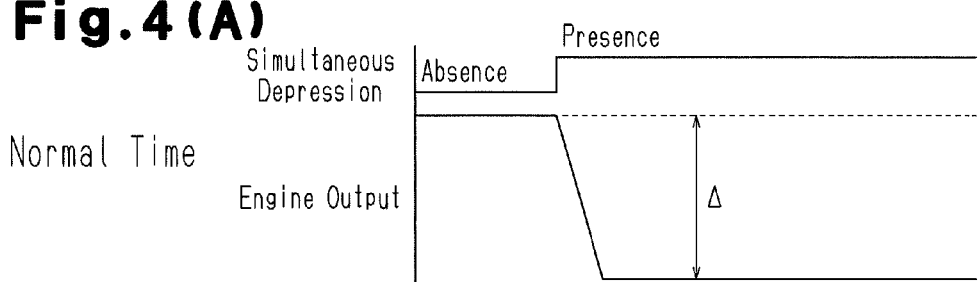
FIG. 4(A) is a time chart showing a mode for setting the amount of decrease Δ of the engine output in the output suppression control during a normal time according to another embodiment of the present invention.
Figure 4B:
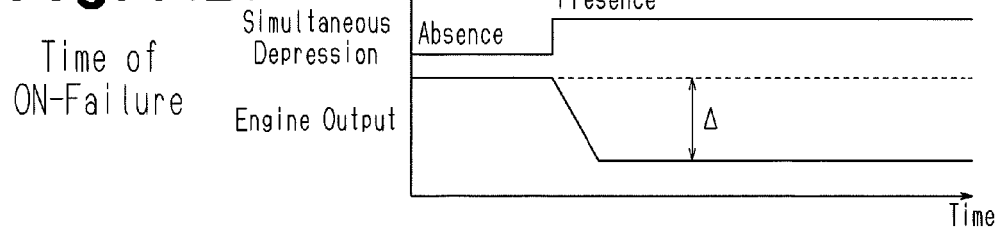
FIG. 4(B) is a time chart showing a mode for setting the amount of decrease Δ of the engine output in the output suppression control during a time of an ON-failure of the stop lamp switch in the embodiment of FIG. 4(A).

In the above described embodiment, at an ON-failure of the stop lamp switch 5, the output suppression control for the engine 6 is cancelled when the accelerator pedal 2 and the brake pedal 4 are simultaneously depressed. However, the present invention may be modified as shown in FIGS. 4(A) and 4(B). That is, at an ON-failure of the stop lamp switch 5 (FIG. 5(B)), the amount of decrease Δ of the output of the engine 6 in the output suppression control may be reduced compared to a case in which there is no such a failure (FIG. 5(A)). This configuration suppresses the degradation of the drivability to a certain extent.

In the above described embodiment, the amount of depression of the accelerator pedal 2 is overwritten to reduce the opening degree of the throttle valve 8, so that the engine output is reduced. However, engine output may be reduced by another engine controlling process such as reduction of the fuel injection amount or retardation of the ignition timing.

In the above described embodiment, an ON-failure is detected from the duration of an ON state of the stop lamp switch 5. However, the detection may be performed in other methods. For example, when the stop lamp switch 5 has an ON-failure, switching on and off of the switch 5 is not detected. Thus, an ON-failure of the stop lamp switch 5 can be detected based on whether the number of detected on/off switching of the stop lamp switch 5 is significantly small in a certain vehicle traveling period. Also, when the stop lamp switch 5 has an ON-failure, the output suppression of the engine 6 is executed each time the accelerator pedal 2 is depressed, and an intended increase of the drive force of the vehicle cannot be obtained. This can cause the driver to repetitively depress the accelerator pedal 2. Thus, an ON-failure of the stop lamp switch 5 can be detected based on whether the number of depressions of the accelerator pedal 2 is significantly great in a certain vehicle traveling period.

In the above illustrated embodiment, at an ON-failure of the stop lamp switch 5, the output suppression control for the engine 6 is cancelled or the amount of decrease of the engine output is decreased in the output suppression control. Accordingly, even at an ON-failure of the stop lamp switch 5, an increase in the vehicle drive force in response to depression of the accelerator pedal 2 is enabled, and degradation of the drivability is suppressed. It is also effective, as a failure coping method, to execute control for notifying the driver of a failure. For example, at an ON-failure of the stop lamp switch 5, the output suppression control for the engine 6 may be intermittently executed when the accelerator pedal 2 is depressed. In this case, when the driver depresses the accelerator pedal 2, the engine output is repetitively increased and decreased. This allows the driver to notice the failure.

Although depression of the brake pedal 4 is detected from the stop lamp switch 5 in the above described embodiment, depression of the brake pedal 4 may be detected from a sensor other than the stop lamp switch 5. For example, depression of the brake pedal 4 can be detected based on a detection result of a brake pressure sensor that detects the pressure of hydraulic pressure of the brake device.

In the above described embodiment, an acceleration input and a brake input are performed through depression of the accelerator pedal 2 and depression of the brake pedal 4. However, an acceleration input and a brake input may be performed through other types of operations. Operations other than pedal depression include, for example, a manual operation using a paddle shifter and a voice operation.

In the above described embodiment, the present invention is applied to a control device of a vehicle that employs the engine 6 as the drive source. However, the present invention may be applied, for example, to electric cars, which use a motor as a drive source, and hybrid cars, which use a motor and an engine as drive sources.

DESCRIPTION OF THE REFERENCE NUMERALS

1 . . . Electronic Control Unit (1*a* . . . Central Processing Unit (CPU), 1*b* . . . Read-Only Memory (ROM), 1*c* . . . Random Access Memory (RAM)), 2 . . . Accelerator Pedal, 3 . . . Accelerator Pedal Sensor, 4 . . . Brake Pedal, 5 . . . Stop Lamp Switch, 6 . . . Engine (Drive Source), 7 . . . Intake Passage, 8 . . . Throttle Valve, 9 . . . Throttle Motor.

The invention claimed is:

1. A control device for a vehicle, wherein the control device is applied to a vehicle that obtains drive force from output of a drive source and the control device comprising a control circuit configured to execute output suppression control for the drive source when an accelerator input and a brake input are performed simultaneously,
    wherein, when the control circuit discovered that a number of accelerator inputs during a preset vehicle traveling period is greater than or equal to a preset number, wherein the preset number is more than one, the control circuit is configured to change a control mode of the output suppression control from a control mode of the output suppression control when there is no such discovery, to prevent a drivability from being degraded in which a state of a brake input being performed continues even though an operation for a brake input is not actually being performed.

2. A control device for a vehicle, wherein the control device is applied to a vehicle that obtains drive force from output of a drive source and the control device comprising a control circuit configured to execute output suppression control for the drive source when an accelerator input and a brake input are performed simultaneously,
    wherein, when the control circuit discovered that a number of accelerator inputs during a preset vehicle traveling period is greater than or equal to a preset number, wherein the preset number is more than one the control circuit is configured not to execute the output suppression control, to prevent a drivability from being degraded in which a state of a brake input being performed continues even though an operation for a brake input is not actually being performed.

3. A control device for a vehicle, wherein the control device is applied to a vehicle that obtains drive force from output of a drive source and the control device comprising a control circuit configured to execute output suppression control for the drive source when an accelerator input and a brake input are performed simultaneously,
    wherein, when the control circuit discovered that a number of accelerator inputs during a preset vehicle traveling period is greater than or equal to a preset number, wherein the preset number is more than one, the control circuit is configured to reduce an amount of decrease of the output of the drive source in the output suppression control compared to a case in which there is no such discovery, to prevent a drivability from being degraded in which a state of a brake input being performed continues even though an operation for a brake input is not actually being performed.

* * * * *